Dec. 21, 1937. E. S. CORNELL ET AL 2,102,887
ELECTRICAL SWITCH GEAR
Filed June 9, 1934 3 Sheets-Sheet 2
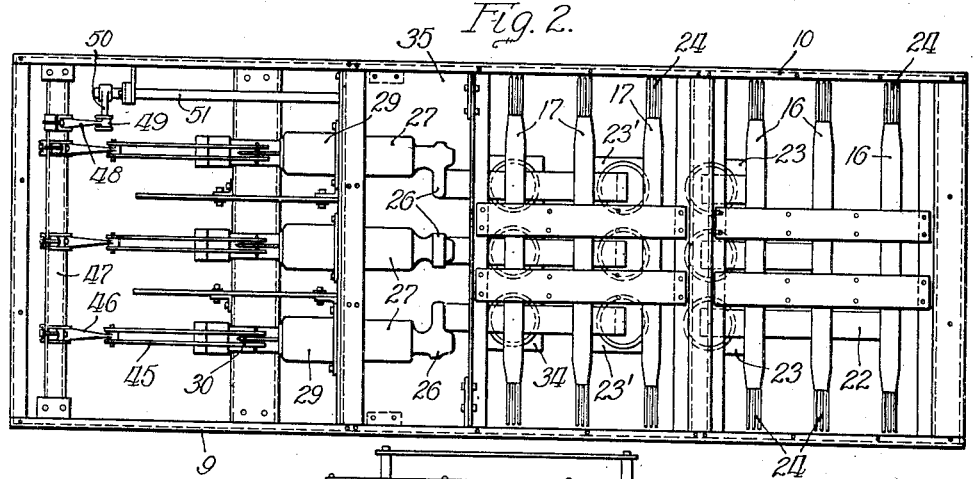
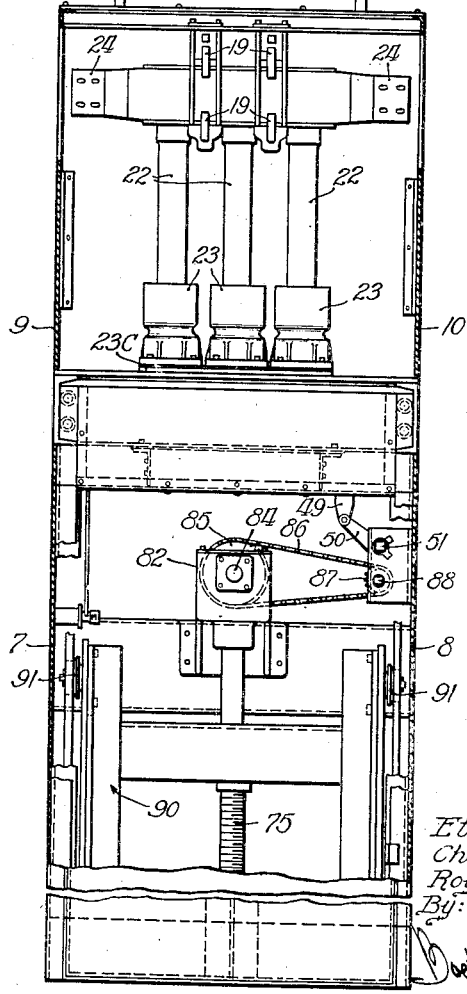
Inventors:
Elias S. Cornell
Charles A. Koerner
Roy A. Sternaman Dec. 21, 1937.  E. S. CORNELL ET AL  2,102,887
ELECTRICAL SWITCH GEAR
Filed June 9, 1934   3 Sheets-Sheet 3
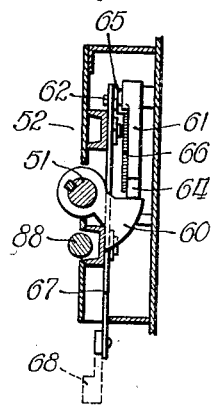
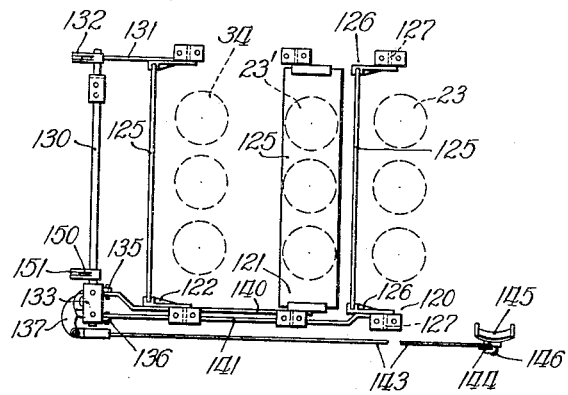
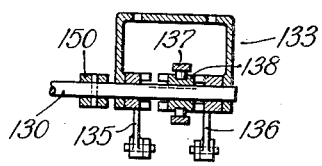
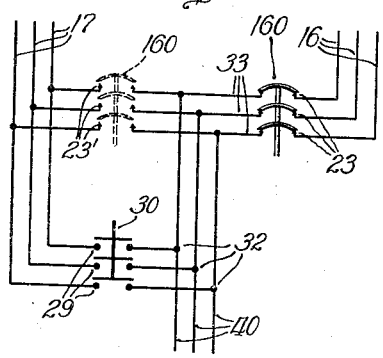
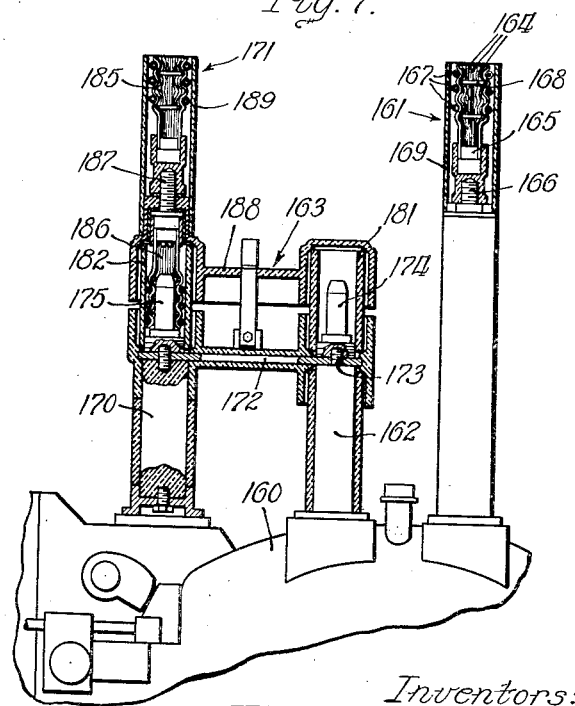
Inventors:
Elias S. Cornell
Charles A. Koerner
Roy A. Sternaman
By: Brown, Jackson, Boettcher & Dienner
Attys.

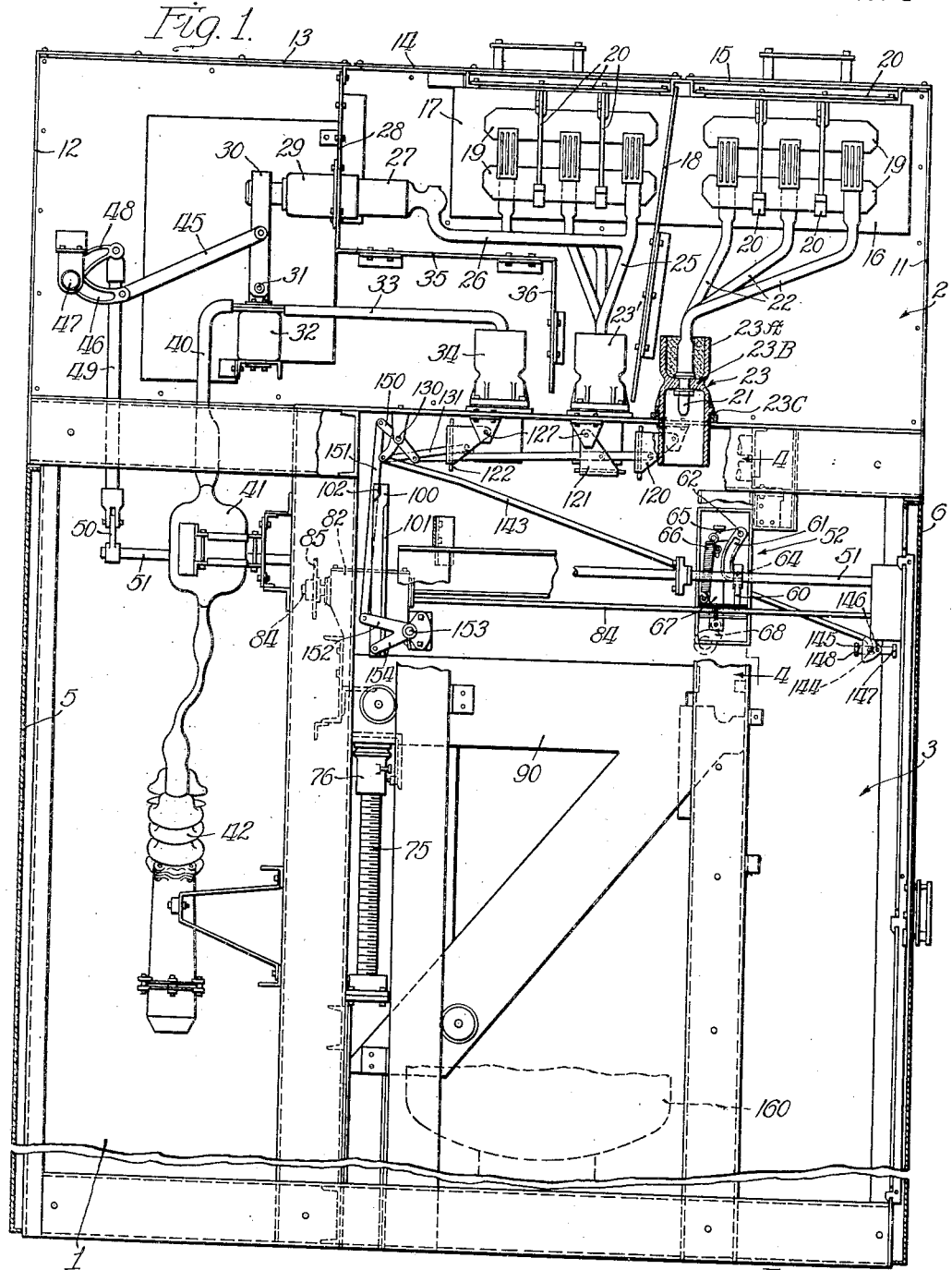

Patented Dec. 21, 1937

2,102,887

UNITED STATES PATENT OFFICE 2,102,887

ELECTRICAL SWITCH GEAR

Elias S. Cornell, Evanston, and Charles A. Koerner and Roy A. Sternaman, Chicago, Ill., assignors to The Delta-Star Electric Company, Chicago, Ill., a corporation of Illinois Application June 9, 1934, Serial No. 729,820

12 Claims. (Cl. 175—298)

This invention relates to electrical switchgear, and more particularly to metal clad switchgear of the type employing a main bus and a transfer or auxiliary bus, the switchgear comprising, in general, a stationary switchgear structure or cubicle, and a removable element, such as an oil circuit breaker or the like.

In the use of this type of equipment, considerable difficulty has been encountered in providing for transference of the load from one bus to the other without circuit interruption. Safety of operation is essential, since the currents carried by such switchgear are extremely dangerous, and the equipment must be maintained compact, inasmuch as the switchgear structure has a minimum amount of available space in which to mount and operate switching mechanism for accomplishing this purpose.

The present invention is directed primarily to a method of effecting this transfer without circuit interruption and with the utilization of only a minimum amount of switching mechanism. In addition, we have provided for interlocking the switching mechanism and oil circuit breaker to prevent improper transfer of the load and to provide for protection of the equipment and the operating personnel during this transferring operation.

In the present embodiment of the invention, we preferably employ a gang-operated disconnect switch which is interlocked for operation with a lift type circuit breaker that is removable from the cubicle. Such a circuit breaker ordinarily is moved into and out of the cubicle upon a truck, and may be raised or lowered by suitable hoisting mechanism. A preferred structure of this type which may be employed in connection with the present invention is disclosed in the copending application of Elias S. Cornell, Charles A. Koerner and Joseph A. Stoos, Serial No. 685,048, filed August 14, 1933 now Patent No. 2,057,084.

The transfer is accomplished by switching mechanism which has incorporated therein means providing for disconnecting the breaker from the circuit which extends between the bus and the feeder, and for by-passing the breaker in order to provide for removal thereof. In connection with this feature, our method, as disclosed in the present invention, contemplates a scheme whereby the switching mechanism is so interlocked with the breaker that it can be operated only when the breaker is in operative position and is closed or connected into the circuit.

A further object of the present invention is the provision of a switching method for first transferring the load from a main bus to a transfer bus, and then providing for removal of the circuit breaker from operating position in the main bus circuit and the returning of the breaker to operative position in the transfer bus circuit without interrupting the circuit between the busses and the feeder connection. Correspondingly, our invention contemplates re-transferring of the load from the transfer bus back to the main bus by by-passing of the oil breaker in the transfer bus circuit, reconnection of this breaker into the main bus circuit, and subsequent disconnection of the by-pass switching mechanism, whereupon the transfer bus is cut out of the circuit and the main bus assumes the load, the entire operation being accomplished without interrupting the circuit from the busses to the feeder.

In order to prevent accidental connection of the breaker into the wrong circuit, and to provide for protection of the operator or maintenance personnel in working around the breaker and within the cubicle, we have provided a novel method of closing off the disconnect terminals of the busses and the feeder, these terminals leading from the live conductors of the busses and feeder to the circuit breaker disconnect contacts. In a preferred form of the invention, we accomplish this object by the provision of a shutter mechanism which may be selectively controlled from the front panel of the cubicle to close off the desired disconnect contacts so that there will be no possibility of accidental contact therewith. In addition, the shutter mechanism positively prevents connection of the breaker to the wrong bus, since the circuit breaker cannot be raised to operative position unless its terminals are positioned in accordance with the disconnect contacts to which the breaker is to be connected.

The shutters are provided with operating linkage connected to the main operating shaft, upon which is mounted a selective clutch having means for operating the same and provided with indicating means disposed at the forward portion of the cubicle structure to provide for positioning of the shutters in the desired position. By operation of the linkage mechanism and the clutch, it is possible to close off the contacts for both busses and the feeder circuit, so that the operator within the cubicle cannot accidentally come into contact with these terminals, since they may be connected to live conductors.

Another object attained by the present invention is the provision of means for preventing interruption of the feeder circuit except through the oil circuit breaker, which is capable of absorbing the resulting rupturing discharge. Thus, we provide an interlock which prevents operation of the disconnect or by-pass transfer switch mechanism unless the circuit breaker is in raised position and is closed or connected into the circuit.

The interlocking means is controlled by the circuit closing mechanism of the breaker, and prevents either opening or closing movement of the transfer switching means unless the circuit is being carried through the breaker. This prevents arcing at the switch contacts of the transfer switch mechanism, and results in the use of a simplified switch structure which does not have to meet the relatively heavy arcing requirements of the ordinary switch of this type. This means that the design of the switch may be simplified, with consequent economy of construction resulting therefrom, in addition to simplified operation and the provision of a smaller and more compact switching mechanism.

The transfer switch therefore at no time is connected into an open circuit, and does not at any time break an existing circuit. This switching mechanism cannot be operated when the circuit breaker is open or in lowered position, but in such instance must remain in the position in which it happens to be when the breaker is opened. Further, the switch itself cannot be operated from any but a fully open or fully closed position.

Other objects and advantages of the switching system disclosed in the present invention will appear more fully from the following detailed description, which, taken in connection with the accompanying drawings, will disclose to those skilled in the art the particular operation and construction of a preferred embodiment of our invention.

In the drawings:

Figure 1 is an elevational view of a switchgear cubicle structure, taken along the line 1—1 of Figure 3;

Figure 2 is a top view looking down into the cubicle structure, taken substantially on the line 2—2 of Figure 1;

Figure 3 is a side view taken along the line 3—3 of Figure 1 and illustrating the front of the mechanism when the front cover plate has been removed;

Figure 4 is a sectional view of the interlock between the circuit breaker operating shaft and the transfer switching mechanism, taken on the line 4—4 of Figure 1;

Figure 5 is a diagrammatic view illustrating the operation of the shutter mechanism;

Figure 6 is a view taken along the line 6—6 of Figure 5;

Figure 7 is a fragmentary sectional view of the transfer plug used on the circuit breaker; and Figure 8 is a diagrammatic illustration of the circuit connections employed in the present invention.

Referring now in detail to Figures 1, 2 and 3, each unit of the switchgear structure is metal enclosed, with self-contained factory assembled switchgear and busses wired and ready for installation. Each unit preferably comprises a stationary element, commonly called a cubicle, and a removable element comprising an oil circuit breaker of the vertical lifting and lowering type. The stationary element or cubicle is indicated at 1, and comprises a rigidly spaced welded structural steel supporting frame with heavy sheet metal enclosing plates. The cubicle is divided into an upper compartment 2 containing the busses and the transfer switching equipment, and a lower compartment 3 containing the elevator mechanism for the oil circuit breaker, the switch control apparatus, the shutter control apparatus, the interlocks and, optionally, the metering transformers or the like.

The lower compartment is provided with a removable rear panel 5 for providing access to the rear of the cubicle. It is also provided with a front panel 6 hung on concealed hinges so that the door face is flush with the front of the unit when in closed position. The sides of the lower compartment are enclosed by sheet metal panels 7 and 8.

The enclosure for the upper compartment is separate from the enclosure for the lower compartment, and comprises side panels 9 and 10 which are provided with openings for extending connection to the busses, and front and rear panels 11 and 12. The top of the cubicle structure is enclosed by three separate top panel sections 13, 14 and 15. All the panels are secured to and removable from the structural steel frame for providing access to the interior of the cubicle.

In the preferred embodiment of the invention disclosed, which is directed to a three-phase distribution system, a three-phase main bus 16 and a three-phase transfer or auxiliary bus 17 are mounted in the upper compartment and extend the full width thereof, being separated by a barrier 18 formed of insulating material such as bakelite or other suitable insulation mounted upon suitable brackets secured to the enclosing structure. Each set of busses is rigidly supported by a pair of supporting bars 19 formed of suitable insulation, which embrace the bus bars and securely clamp them in position, the bars 19 being in turn rigidly secured together by metal cross members 20—20 and suitable hangers therefor.

Each of the bus conductors 16 is provided with laminated copper taps 22 which are welded or otherwise secured to the respective bus conductors, each of the taps terminating in a cylindrical plug or disconnect member which constitutes the male terminal of a primary plug disconnect switch 23, as will be more fully described hereinafter. Each bus conductor, with its associated tap, is enclosed in wrapped insulation comprising a laminated paper insulation wrapped under tension, each layer being coated with phenolic varnish, solidly pressed and cured in heated molds. This insulating method eliminates voids, looseness, warps and cracks.

A three-phase bus unit therefore comprises a bus, its support, bus taps and stationary ends of plugs 21 with their insulating bushings 23A. This is assembled before installation in the cubicle and may be easily removed as a unit. The ends 24 of the busses are silver plated and, with their bolted connection between splice plates that extend the connection to or from the busses, insure permanent high conductivity therebetween.

Each of the plug disconnectors 23 for the main bus includes a tube of insulation 23A of material such as bakelite which tube is divided into upper and lower receptacles by an internal web 23B having an opening through which the male plug 21 extends, the plug being secured to the web by a suitable nut. The three tubes of insulation 23A of the main bus extend through openings in an escutcheon plate 23C and are secured thereto, the lower portion of each tube of insulation extending through the escutcheon plate. This completes the main bus unit for mounting within the upper compartment of the cubicle. In assembling the bus within the cubicle the escutcheon plate is secured to the base of the upper compartment 2, and the upper part of the tube of insulation 23A is filled with insulating compound after assembling of the bus.

The auxiliary or transfer bus disconnector 23' and the line disconnector 34 are of a construction similar to that of the main bus disconnector 23.

The reserve or transfer bus 17 is of a construction substantially identical to that of the main bus 16. The taps 25 that are connected to the reserve bus correspond to the taps 22 of the main bus, and are each provided with an additional tap 26 covered with insulation as are the taps 22, and extending the electrical connection from the reserve bus through insulating bushings 27 supported by a plate 28, to a stationary terminal 29 of a transfer switch 30. There are three such switches, one for each phase. The blades of the disconnect switches are mounted upon hinged terminals 31 supported by insulators 32. The hinge terminal of each transfer switch 30 is connected, by way of an insulated tap 33, to a male plug similar to the plug 21, and comprising a part of the plug disconnector 34. Insulating barriers 35 and 36, of bakelite or the like, separate the taps 33 from the taps 25 and 26. The hinged terminals 31 of the transfer switches 30 are connected to an incoming or outgoing line conductor by way of insulated taps 40 that extend through current transformers 41 to potheads 42.

The transformers are for metering purposes and the like, and may be supported in any desired manner within the cubicle structure. Further, these transformers may be disposed in other positions than the position shown in the preferred embodiment of the invention.

The three switch blades are connected by insulating links 45 and cranks 46 to a shaft 47. Rotation of the shaft operates the three switches in unison, the shaft being rotated by a crank 48 connected to a reciprocating rod 49, which rod is in turn connected at its lower end through crank 50 to an operating shaft 51 extending from the rear of the cubicle through an interlock 52 to the front of the cubicle. The interlock 52 locks the shaft 51 against rotation in either direction except when the circuit breaker is in its elevated and closed position, as will be described in detail hereinafter.

Considering now Figures 1 and 4, the interlock 52 comprises an interlock sector 60 keyed or otherwise secured to the shaft 51 and cooperating with an interlock latch lever 61 which is pivoted about a stationary pivot 62 and which includes a projection 64 extending into the path of movement of the interlock sector 60. An arm 65 is formed integrally with the interlock latch lever 61 and is engaged by a spring 66 for biasing the latch lever to its locking position. The interlock sector 60 is shown in the position it occupies when the transfer switch is in closed position, as shown in Figure 1. To open the transfer switch it is necessary to rotate the shaft 51 in a counter-clockwise direction as viewed in Figure 4. The interlock sector 60, however, normally abuts against the projection 64 of the interlock latch lever 61 and locks the shaft 51 against rotation.

In order to free the interlock sector it is necessary to rotate the interlock latch lever 61 clockwise, as shown in Figure 1. This is accomplished by a link 67, which engages the arms 65 and, upon upper movement of the link, is adapted to move the arm 65 and the interlock latch lever clockwise until the projection 64 clears the interlock sector 60. This movement is against the action of the spring 66. The link 67 is mounted for vertical sliding movement upon a pair of pin members engaging in slots formed in the link member. Upward movement of the link 67 is obtained by means of a cam 68 mounted upon the operating shaft of the oil circuit breaker and brought into the position shown in Figure 1 when the oil circuit breaker is fully elevated into its operating position.

The cam 68 is shown in the position which it occupies when the circuit breaker is open or not connected to the circuit. In this position it does not raise the latch 67, and therefore the shaft 51 cannot be rotated. To release the interlock latch lever 61 it is necessary to close the circuit breaker, thus rotating the cam 68 in a counter-clockwise direction, as viewed in Figure 1. This forces the link 67 upwardly, which in turn raises the projection 64 and clears the interlock sector 60 to permit movement of the sector and rotation of the transfer switch operating shaft 51. The shaft 51 may now be rotated in a counter-clockwise direction to open the transfer switch 30. When this is accomplished, the sector 60 is moved into a position where its lower edge is immediately above the upper edge of the projection 64 of the interlock latch lever. If the circuit breaker is then operated to its open position the cam 68 moves in a clockwise direction to the position shown in Figure 1, and the spring draws the link 68 and arm 65 to the position shown in Figure 1, thus returning the latch lever to a position wherein the projection 64 locks the shaft 51 against clockwise rotation, that is, against rotation in switch closing direction, by engagement of the abutment 64 under the sector 60. By this arrangement the transfer switch 30 can be operated to its open or to its closed position only when the circuit breaker is in upper operating position and is closed or connected into the circuit.

Inasmuch as the details of the housing mechanism for the circuit breaker are described in detail in the above-referred to copending application, it is not believed that a description thereof is necessary, except insofar as to describe the cooperating relationship between the position of the circuit breaker and the interlocks for the transfers which operate the mechanism.

In the present embodiment, the elevator supporting and operating mechanism comprises a worm gear of the jack screw type, including a worm 75 supported against longitudinal movement and carrying a nut 76 which rides up and down on the worm as the worm is rotated. At its upper end, the worm 75 is journaled within a gear box 82, which gear box includes an operating shaft 84 carrying a sprocket wheel 85, which sprocket wheel is connected through the chain drive 86 to a smaller sprocket wheel 87 mounted upon an operating shaft 88 which extends to the front of the cubicle and is adapted to be rotated either by an operating handle or by mechanical operating means. The circuit breaker is adapted to be raised and lowered by rotation of the worm 75, the breaker being supported upon suitable flange plates carried by the supporting frame indicated generally at 90, and which is adapted to be vertically guided in its movement by the roller 91.

The movable breaker supporting frame 90 is provided with a shutter operating cam plate 100 having a guideway 101 secured thereto and extending almost, but not quite, to the top of the plate, with a short guideway 102 secured at the opposite edge and adjacent the top of the plate. The guideways 101 and 102 have adjacent corresponding beveled ends. The plate 100 is adapted to move up and down with the elevator mechanism.

Referring now in detail to Figures 1, 5 and 6, the shutters of the present invention are of substantially identical construction and are indicated at 120, 121, and 122. Each of the shutters comprises a rectangular plate 125 mounted on pivoted brackets 126 that pivot about the stationary pivots 127. The shutters are adapted to be swung from a position covering the openings at the lower end of the plug disconnectors 23—23'—24 to a position free of these openings and at one side thereof.

In Figure 1 the shutter 121 is shown in its closed position, that is, in a position in which it closes off or covers the lower opening of the plug disconnector 23'. The shutters 120 and 122 are shown in this figure in their open position, that is, in the position uncovering the openings of the plug disconnectors 33 and 34, respectively. An operating shaft 130 controls the operation of the shutters. This shaft is connected to the shutters by means of link connections, the shutter 122 being connected thereto by a link 131 and a crank arm 132, so that rotation of the shaft 130 will always actuate the shutter 122.

The shutters 120 and 121 are selectively operated from the shaft 130 through a clutch mechanism 133, as shown in Figures 5 and 6. For this purpose the clutch mechanism has two cranks 135 and 136 extending therefrom and selectively connected to the operating shaft 130 by a clutch operating lever 137 and a clutch collar 138, splined to and slidable upon the shaft 130. The crank 135 is connected to the shutter 121 by means of a link 140, whereas the crank 136 is connected to the shutter 120 by means of a link 141. Rotation of the operating shaft 130 will produce rotation of one or the other of the two cranks 135, 136, depending upon which one of the cranks is clutched to the shaft 130, determined by the position of the clutch collar 138. This will produce an opening or closing of the corresponding shutter 120 or 121.

The clutch is manually operated by means of an operating rod 133 that extends forwardly to the front of the cubicle and is pivoted at 146. A clockwise rotation of the handle 145 shifts the clutch collar 138 from the position shown, where the main bus shutter 120 is operatively connected with the shaft 130, to its opposite position, where the auxiliary or transfer bus shutter 121 is operatively connected to that shaft, namely, from a position where the crank 136 is clutched to the shaft 130, to a position where the crank 135 is clutched to the shaft 130. It is to be understood that operation of the handle 145 merely shifts the clutch, it does not produce operation of the shutters. The exposed end 147 of the operating handle 145 may have a letter "M" marked thereon, indicating that in this position of the operating handle the main bus shutter will be operated. Likewise, if desired, the opposite end 148 of the operating handle may have the letter "R" marked thereon, indicating that in this position of the operating handle the reserve or auxiliary bus disconnect shutter is connected for operation.

The actual operation of the shutters is brought about by rotation of the shaft 130. This is accomplished through a crank 150 keyed to the shaft 130 and pivotally connected by a link 151, which, at its opposite end, is secured to one arm 152 of a double armed lever. The lever is pivoted about the stationary pivot 153 and has a second arm 154 which carries, at its outer end, a roller that rides against the guideway 101 of the shutter operating cam 100.

The elevator mechanism, and with it the shutter operating cam 100, is shown in its uppermost position in Figure 1. As the elevator is lowered, the roller at the end of the arm 154 rides against the guideway 101 until the elevator approaches its lowermost position. At that time the roller clears the upper beveled edge of the guideway 101 and is forced to the right, that is, counter-clockwise by the lower beveled edge of the guideway 102. Counter-clockwise rotation of the double armed lever causes a corresponding rotation of the shutter operating shaft 130 through the link 151 and the crank 150. This causes operation of the shutter 122 and the particular one of the shutters 120 or 121 that is clutched to the shaft 130, in this instance the shutter 120. This brings all the shutters to their closed position, that is, to a position the same as that of the shutter 121. If the elevator is subsequently raised, the upper beveled edge of the guideway 101 rotates the crank arm 154 clockwise, thus producing a corresponding rotation of the shutter operating shaft 130. This causes an opening of the shutter 122 and of the connected one of the shutters 120 or 121, in this instance 120. The opening of the shutters is accomplished at the initiation of the upward movement of the elevator. The closing of the shutters is accomplished at substantially the completion of the downward movement of the elevator.

The shutter mechanism has two distinct functions. First, since the shutters are always closed when the elevator mechanism is in its lowered position, they prevent accidental contact with the plug disconnectors that are connected to the busses or to the incoming or outgoing line. Second, upon raising of the elevator mechanism, they uncover only the selected one of the two bus connectors, and thus prevent accidental contact with the other bus. The operating handle 145 may be set in the position indicated in Figure 1, and padlocked against unauthorized operation. This provides for uncovering of the shutter that controls connections to the main bus, but it definitely precludes the establishment of connection to the reserve or transfer bus 17. Likewise, the operating handle may be locked in its opposite position to provide for access to the transfer bus 17 while precluding access to the main bus 16.

A circuit breaker 160 is provided for establishing connections between the conductor 33 (Figure 1) and the main bus or the transfer bus. The circuit breaker is here shown as a three-phase breaker, and includes the socket terminals 161, one for each pole, which establish connection with the corresponding phase conductors 33. It also includes three terminal studs 173 which, by means of an adapter or transfer plug 163, are adapted to cooperate with the plug disconnectors 23 and 23' of the main or of the transfer bus. The socket terminals are of a construction such as shown in the pending application of Alsaker and Fred H. Cole, Serial No. 681,153, filed July 19, 1933 now Patent No. 2,031,296.

Briefly, the socket comprises a large number of contact wires 164, swaged or otherwise suitably secured to a plug 165 that is threaded over a terminal stud 166 comprising one terminal of the circuit breaker. Coiled springs 167 in the form of rings, embrace the contact wire assembly and urge the wires inwardly into firm engagement with a plug. A plurality of internal rings 168 limit the extent of inward collapse of the contact wires when the socket is not engaged about a plug.

A sleeve 169 of suitable insulation surrounds the contact socket for preventing accidental contact therewith. It is to be noted that the terminal studs 173 are appreciably below the terminal studs 166. When the adapter 163 is mounted in place it brings the overall height of the corresponding terminal of the circuit breaker to the level of the socket terminals 161.

The adapter 163 is of a form which is described in detail in the copending application of Joseph C. Rah, Serial No. 687,457, filed August 30, 1933. Suffice it to say that the adapter comprises a transfer stud support 170 which is adapted to be mounted upon the breaker, and which extends for a height substantially equal to the height of the stud 162. Extending between the studs is a copper bar member 172 which is molded within a bakelite or other suitable insulating casing, and which is adapted to provide for extension of contact from the stud 162 to a stud 175 which receives a socket member 186 corresponding to the socket member 164. The socket member 186 extends upwardly and is engaged in a plug member 187, which plug member, in turn, is connected to an upstanding socket 185 disposed at the same level as the socket 164, and enclosed within a suitable insulating tube 189.

The housing 188, which contains the socket 185 and the socket 186, is reversible, and may be disposed in position so that the socket 186 extends over the stud 174, whereupon the terminal 171 is disposed adjacent the terminal 161. The housing 188 is formed of bakelite, and fits over an insulating tubular member 181 surrounding the socket 174 and a similar member 182 surrounding the terminal plug 175. The details of construction of this transfer plug are described in the above mentioned copending application of Joseph C. Rah.

In the position shown in Figure 7, the terminal 161 is engaged with the disconnect plug carried by the disconnect socket 34, and is thus connected to the feeder tap 40. The terminal 171 is engaged with the contact plug 21 disposed in the disconnect switch 23, and consequently the circuit breaker extends the circuit from the main bus 16 through the disconnect switch 23 and the circuit breaker 160 to the feeder disconnect switch 34, and then through the taps 33 and 40 to feeder pothead 42. When the transfer plug 163 is reversed, the circuit extends from the feeder pothead 42 through tap 40 and tap 33 and through disconnect switch 34 to terminal 161, thence through the circuit breaker and out through terminal 174, socket 186 and socket 185 of terminal 171 to the disconnect switch 23' leading to the transfer bus 17.

The circuit breaker 160, which is mounted upon the supporting frame 90 as shown in Figure 1, is provided with suitable interlock means which prevent lowering of the breaker until it has been disconnected from the circuit. The particular details of construction of this interlock mechanism are not a part of the present invention, and reference thereto may be had to the copending application of Cornell, Koerner and Stoos.

In Figure 8 there is shown diagrammatically the circuit connections employed in the present invention. It will be noted from this wiring diagram that with the circuit breaker 160 in closed position between contacts 23 of the main bus 16 and taps 33 of the feeder line, the main bus is connected through the circuit breaker to the feeder line taps 40. By actuation of the switch 30, the transfer bus 17 is connected to the taps 40 in parallel with the bus 16. Both busses are now connected to the feeder circuit. Upon disconnection of the breaker 160 from contacts 23, therefore, there will be no interruption of the circuit, but the load will all be carried by the transfer bus 17 through switch 30. Thereafter, the breaker 160 can be connected in the position shown in dotted lines in Figure 8, between the disconnect contacts 23' of transfer bus 17 and the feeder taps 33. The breaker is now in parallel with the switch 30, and no circuit interruption occurs during connection of the breaker in this position. Subsequently, the switch 30 can be opened, whereby the entire load is taken by the breaker 160, and the transfer bus is now connected through the breaker 160 to the feeder taps 40. This sequence of steps is reversed when it is desired to retransfer the load to the main bus 16.

In the operation of the transfer switching scheme shown in the present invention, the circuit breaker is ordinarily in raised position, and, for the purposes of illustration, it will be assumed that the transfer plug 163 is in the position shown in Figure 7, in which a circuit extends from the main bus 16 through the circuit breaker and the taps 33 and 40 to the feeder pothead 42. With the circuit breaker in raised position and with it connected into the circuit, the cam 68 is rotated in a counter-clockwise direction by the closing movement of the circuit breaker, and consequently the latching portion 64 of the arm 61 is moved out of engagement beneath the sector 60 carried by the transverse switch operating rod 51.

Assuming now that it is desirable to transfer the load from the main bus 16 to the transfer bus 17, the operator or maintenance man at the front of the cubicle rotates the shaft 51 in a clockwise direction, which causes upward movement of the connecting lever 50, and consequent upward movement of the rod 49. This results in movement of the arm 46 in an upward direction, as viewed in Figure 1, and results in engagement of the switch blade 30 with the switch contacts 29 connected to the by-pass tap 26 within the disconnect bushing 27. The blades 30 rotate about the pivot 31 during switch closing movement. When the switch 30 has been closed, it being understood that there are three similar switches 30 engaging the three phases of the circuit simultaneously, the feeder pothead 42 is connected both to the main bus 16 through the circuit breaker, and to the auxiliary bus 17 through the taps 26, the switch 30, and the tap connections between the conductors 33 and 40. The transfer bus 17 is preferably energized prior to closing of the switch 30.

The circuit breaker is then disconnected from the circuit extending from the main bus 16 to the feeder, and this causes rotation of the cam 68 in a clockwise direction, causing the latch portion 64 of the arm 61 to engage over the sector 60, preventing counter-clockwise rotation of the shaft 51. The circuit breaker may then be lowered from its elevated position and, upon lowering of the breaker, the arm 154 moves along the guideway 101 of the cam plate 100, and is moved by engagement with the guideway 102 to rotate the shaft 130 which drops the shutters 122 and 120 into closing position with respect to the disconnect switches 23 and 34, thus closing off all of the disconnect switches. It will be noted that the shutters 120, 121 and 122 are not actuated to closed position until the breaker elevating mechanism 90 is lowered to approximately its lowermost position, at which time the arm 154 engages the guideway 102 for effecting its closing operation.

When the circuit breaker has been lowered, it can be removed from the cubicle, if desired, and the operator or maintenance man may enter the cubicle and perform any repairs or the like desired therein, without danger of accidentally coming into contact with the live conductors in the disconnect plug switches 23, 23' or 34, by reason of the shutters closing the same. If it is desired to reinsert the breaker in the transfer bus circuit, in order to make repairs or the like on the main bus, the transfer plug 163 of the breaker is reversed from the position shown in Figure 7, and the breaker is placed in the elevating frame and raised to uppermost position.

Prior to raising of the breaker, however, the operating rod 145 is rotated to bring the end 148 thereof to the front of the cubicle, which causes a shifting of the clutch collar 137 to a position where it engages the crank 135 connected to the shaft 130. Upon raising movement of the breaker, the arm 154 is guided within the guideways 102 and 101, and immediately rotates the shaft 132 to maintain the shutter 120 leading to the main bus disconnector in covering position, and opens the shutters 121 and 122 exposing the contacts in the switches 23' and 34. The breaker is raised into position wherein the terminals 161 and 171 engage the respective contacts 34 and 23'. When the switch has been raised into position and connected into the circuit, the interlocking engagement between latch 64 and sector 60 is released, and consequently the shaft 51 may be rotated to disconnect the switch 30. Thus, the transfer bus 17 is now connected through the circuit breaker to the feeder line.

If it is desired to re-transfer from the transfer bus to the main bus, the switch 30 is again closed by rotation of the shaft 51, with the circuit breaker in raised and connected position, and subsequently the circuit breaker may be lowered, since the switch is directly by-passing the breaker, so that it may be disconnected from the circuit without interrupting the same. Upon lowering of the breaker, the shutters 122 and 121 are dropped into closed position, and all three of the disconnect switches are closed. The transfer plug on the breaker is then reversed, the main bus 16 is energized, and the lever 145 is rotated to engage the clutch collar 138 with the crank 136. Upon raising of the breaker, the contact socket 161 is engaged with the plug carried by the disconnect switch 34, and the contact socket 171 is engaged with the stud 21. At the same time, as the breaker is initially raised, the shutters 120 and 122 are rotated away from the ends of the disconnect switches, while the shutter 121 closes off the disconnect switch 23'.

The main bus is thus connected into the circuit, and both of the busses then feed the circuit, the main bus feeding the circuit through the circuit breaker, while the auxiliary or transfer bus 17 feeds the circuit through the switch 30. With the circuit breaker in raised and connected positions, the shaft 51 can be operated to disconnect the switch 30, thus placing the switching mechanism in the position originally described, and thus an entire cycle of transfer is obtained without any circuit interruption to the feeder tap 40.

It is thus apparent that we have provided a transfer switching scheme wherein no interruption of current occurs while the load is transferred from a main bus to a transfer bus, and re-transferred from the transfer bus to the main bus, and which allows the circuit to be maintained during lowering and changing of the oil circuit breaker from one bus connection to the other.

In addition, we have provided a novel cooperating shutter mechanism for preventing accidental or improper connection of the circuit breaker, and providing for protection to the operator or maintenance man working within a cubicle. This shutter mechanism is controlled by a clutch having a linkage connection extending to the front of the cubicle, where it may be readily controlled from outside of the cubicle structure, and is operated by the raising and lowering movement of the circuit breaker elevating mechanism, this mechanism providing for closing of all of the shutters when the elevator mechanism reaches its lowermost position, and provides for opening desired shutters to provide for alternative connection of the circuit breakers to the main bus or to the transfer bus upon the initial elevating of the circuit breaker. Further, we have provided a novel interlocking mechanism which prevents the operation of the transfer switching mechanism unless the circuit breaker is in raised and connected position, and which prevents the rupturing current of the circuit from ever being imposed upon the transfer switch contacts. Thus, the only interruption to the circuit that is possible is by disconnection of the circuit breaker, and, by the switching structure provided, there is no necessity for interrupting the circuit during transfer of the load from one bus to the other or vice versa.

While the construction disclosed herein is provided for the purpose of illustrating a preferred embodiment of our invention, our particular scheme of transferring and by-passing the circuit breaker in order to provide for transfer of the load from one to the other of the busses in the switchgear structure is not to be limited to the specific construction which we have shown for the purpose of accomplishing this result, but is to be defined only by the scope and spirit of the appended claims.

We claim:

1. In combination, a feeder circuit, a transfer bus circuit, a main bus circuit, an oil circuit breaker of the lift type connecting said main bus circuit with said feeder circuit, means for connecting said transfer bus circuit to said feeder circuit in parallel with the main bus only when said circuit breaker is in raised and connected position, means for lowering said breaker, and means for raising said breaker and connecting it between said transfer bus circuit and said feeder circuit, said connecting means for said transfer bus circuit being disconnectable only when said breaker has been connected by said last named means between said feeder circuit and said transfer circuit.

2. In combination, a main bus, a transfer bus, feeder taps, disconnect contacts for said main and transfer busses and said taps, an oil circuit breaker adapted to be connected selectively between said tap disconnect contacts and the contacts of each one of said busses, and switch means for connecting said transfer bus directly to said taps in parallel with the connection between said main bus, said circuit breaker, and said feeder circuit for by-passing said circuit breaker connection therebetween.

3. In combination, a main bus, a transfer bus, feeder taps, disconnect contacts for said main and transfer busses and said taps, an oil circuit breaker adapted to be connected selectively between said tap disconnect contacts and the contacts of each one of said busses, switch means for connecting said transfer bus directly to said taps in parallel with the connection between said main bus, said circuit breaker, and said feeder circuit for by-passing said circuit breaker connection therebetween, and means for preventing operation of said switch means when said breaker is in disconnect position.

4. In combination, a main bus, a transfer bus, feeder taps, disconnect contacts for said main and transfer busses and said taps, an oil circuit breaker adapted to be connected selectively between said tap disconnect contacts and the contacts of each one of said busses, switch means for connecting said transfer bus directly to said taps independently of the circuit breaker connection between said main bus contact and said feeder circuit contact for by-passing said circuit breaker connection therebetween, and means controlled by raising and lowering movement of said circuit breaker for shielding said disconnect contacts.

5. A multiple shutter operating mechanism for shielding the disconnect contacts of a feeder circuit, a main bus and a transfer bus, including remotely disposed means for selectively engaging certain of said shutters to condition said engaged shutters for operation, a lift type circuit breaker adapted to have selective connection with said contacts upon movement into the same raised position, and means controlled by vertical movement of said breaker for operating the engaged ones of said shutters.

6. In combination, in a switchgear cubicle, a main bus disconnect contact, a transfer bus disconnect contact, a feeder bus disconnect contact, shutter means for shielding each of said contacts, means disposed at the front of said cubicle for selectively engaging certain of said shutter means to condition said certain shutters for operation, and a circuit breaker movable only vertically in said cubicle and having means operable upon raising movement thereof for operating the engaged ones of said shutters.

7. In combination, main bus disconnect terminals, transfer bus disconnect terminals, a circuit breaker having contact sockets including means adapted to engage selectively either of said bus terminals when said breaker is disposed in a single raised position, means for raising and lowering said circuit breaker, means controlled by said last-named means for shielding both of said bus terminals as said circuit breaker approaches its lowermost position, and means for selectively unshielding one of said terminals as said breaker is raised toward operative position.

8. In combination, in a cubicle switchgear construction having an upper compartment and a lower compartment, a bus in said upper compartment, a feeder pothead in said lower compartment, disconnect contacts connected to said bus and pothead disposed in said upper compartment and having terminal portions extending down into said lower compartment, a circuit breaker in said lower compartment, means for raising said breaker to connect it across said terminal portions, and switch means in said upper compartment operable only when said circuit breaker is in connected position for connecting said bus directly to said pothead independently of said disconnect contacts.

9. In combination, a bus, disconnect contacts, taps leading from said bus to said contacts, switch contacts, taps extending between said first taps and said switch contacts, a feeder circuit, disconnect contacts therefor, taps extending between said circuit and said disconnect contacts, a circuit breaker adapted to be connected between said disconnect contacts for said bus and feeder circuit, and switch means connected to said feeder circuit taps and engaging said switch contacts for by-passing said circuit breaker, said switch means being operable only when said circuit breaker is in connected position.

10. In combination, in a switchgear cubicle, an upper compartment and a lower compartment, a pair of busses in said upper compartment, disconnect contacts therefor extending into said lower compartment, a feeder pothead in said lower compartment, a disconnect contact therefor in said upper compartment and extending into said lower compartment adjacent said bus disconnect contact, means directly connecting one of said busses to said feeder pothead, switch means in said last named means, a circuit breaker movable vertically in said lower compartment and having contacts engaging selective disconnect contacts, means extending through said lower compartment for operating said switch means, and interlocking means preventing operation of said switch operating means except when said circuit breaker is in raised connected position.

11. In a switch gear cubicle, a circuit breaker movable vertically into and out of operative position, a pair of separate bus disconnect contacts, a feeder circuit disconnect contact, means on said breaker for engaging said feeder circuit contact, means on said breaker for selectively engaging either of said bus disconnect contacts simultaneously with engagement of said feeder circuit contact as said breaker is raised into said operative position, shutter means for each of said disconnect contacts operated selectively upon raising of said breaker, and means operable only when said breaker is lowered for engaging said shutter means to condition the selected shutter means for operation upon subsequent raising of said breaker.

12. In a switchgear cubicle, the combination with main bus, auxiliary bus and feeder circuit disconnect contacts, and an oil circuit breaker adapted for selective connection between either of said bus contacts and said feeder circuit contacts, of switch means at one end of said cubicle for effecting direct connection between said feeder contacts and said auxiliary bus contacts, means extending from said switch means to the opposite end of said cubicle for operating said switch means, means carried by said breaker and operable only when said circuit breaker is in one of its connected positions for conditioning said switch operating means for operation, and means controlled by disconnection of said breaker for closing off all said disconnect contacts and operable upon movement of said breaker toward connected position for selectively opening only the contacts to which said breaker is to be connected.

ELIAS S. CORNELL.
CHARLES A. KOERNER.
ROY A. STERNAMAN.